United States Patent Office.

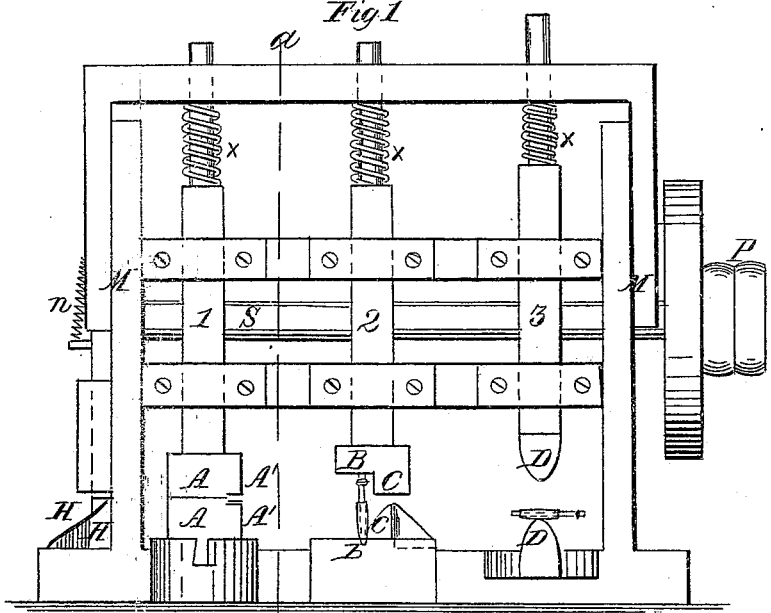
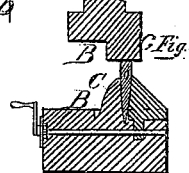
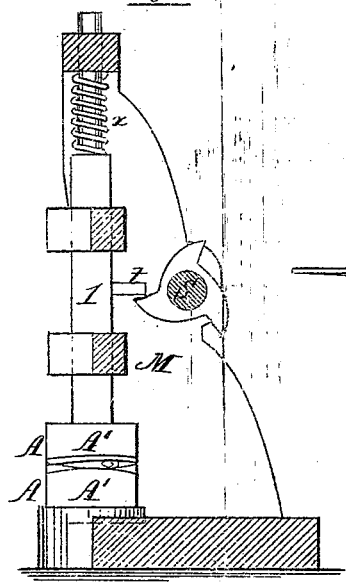
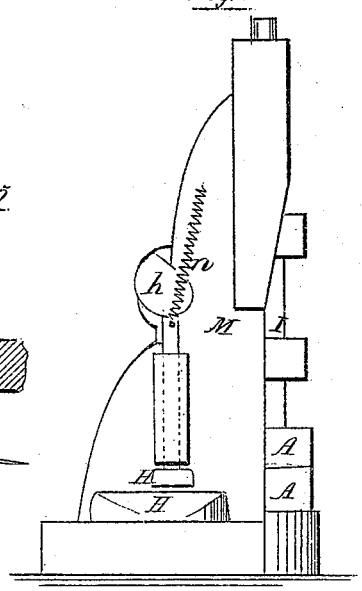
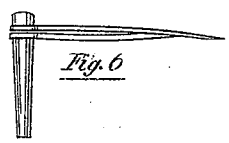

HENRY D. MORRIS, OF BALDWINSVILLE, NEW YORK.

Letters Patent No. 94,232, dated August 31, 1869.

IMPROVEMENT IN MACHINERY FOR MAKING AXES.

The Schedule referred to in these Letters Patent and making part of the same.

*To all whom it may concern:*

Be it known that I, HENRY D. MORRIS, of the town of Baldwinsville, county of Onondaga, and State of New York, have invented certain devices, which, in their combination I have termed an "Axe-Head Hammerer;" and I hereby declare the following to be a sufficiently clear and exact description of the same, that any one skilled in such matters may make and use the same.

The object of my invention consists chiefly in the construction and arrangement of a series of dies, capable of being operated as hammers, instead of by pressure, and so conveniently arranged relatively to each other that the operation of forming the head of an axe may be completed at one heat, or without the necessity of reheating, as is always required when the work is done by hand.

I may here remark that some dies of the exact shape of the axe, or that portion of it to be operated upon, are now used in powerful presses, and that to some extent the operation of shaping is thereby partially accomplished, but the scale or oxide of the iron and other substances that may adhere to the blank, are all squeezed into the metal, and the work is not nearly so completely performed as when a series of blows by hammers of the proper shape are given to the metal, allowing the scale and other extraneous substances to be driven off, and the quality and surface of the metal to be greatly improved.

Figure 1 represents a view of my devices, as combined in one frame or machine, shown in elevation.

Figure 2, a section, through the red line *a b.*

Figure 3, an end view of the machine, in elevation, and where the shears are arranged for trimming off the corners of the axe-poll.

Figure 4 is a section, through the dies and anvil, upon which the clamp or vise is arranged for forming the poll or end of the axe-head.

Figure 5 is an elevation of the dies, shown in fig. 2, but with the axe held edgewise in the edging portion of said dies.

Figure 6 represents the eye-pin or tool used for shaping the eye or hole for the "helve" or handle of the axe.

Like letters refer to like parts in all the drawings.

Upon a frame, as M and M', of any convenient dimensions, and of suitable material, are mounted a series of bars or plungers, 1, 2, and 3, all arranged to work freely in guides, which admit of their being readily lifted by tappets, *t*, upon a shaft, *s*, motion being given to said shaft by any convenient system of belting, as by fast and loose pulleys, shown at *p*, fig. 1.

A certain portion of said bars 1, 2, and 3 is made square where they work through their bearings, to prevent their turning or rotating while moving up and down.

At the upper end of said bars I have used springs, as shown at *x x x*, so arranged that when the bars are lifted by the tappets the springs are compressed or sprung to such an extent that an increased and quicker action is given to the bars than would be given by their gravity alone.

Upon the lower end of said bars are fastened the moving portion of the dies for shaping the axe, and immediately underneath them are arranged, upon suitable anvil-blocks or supports, the corresponding portions of said dies.

These dies are made of any suitable material, as steel or chilled iron, for sustaining the work required of them, and their forms are varied to suit the shape of the axe to be made, though the principles of their operation remain the same in all.

The blank for the head of the axe is made at the iron-works, where a sufficient quantity of iron is cut from a rolled bar to form a single axe, without the steel. An oval-shaped hole, where the eye is to be formed, is also punched in it, and in this condition the axe-maker procures it.

My process then is to attach the steel in the usual manner by hand-work, dressing up said portion ready for the grindstones.

The iron portion of the axe, or that which I term the head, is now to be finished, and the process is as follows:

The blank is raised to the proper working temperature in the forge, fire, or furnace, is then clasped by a pair of tongs, as represented at *q*, fig. 5, the eye-pin, shown at fig. 6, which is considerably smaller at the point than head, is introduced into the hole already formed in the blank, and being controlled by the handle on said pin, the blank is placed on edge, between the dies, as shown at B B, fig. 1, and the pin is there driven down and through the blank, as by a hammer, the lower end of the pin projecting into a recess in the lower die or anvil, as shown by the dotted points at the lower B, underneath hammer 2.

One or two blows of this hammer serve to fix the pin when the tongs are removed, and the blank is then placed on its side, between the dies, at A, the steel of the blank being toward the operator, and best shown at A A, fig. 2, the blank being indicated by the lines in blue.

The faces of these dies being of the proper shape to conform to the sides of the finished axe, a few blows of hammer 1 shape the sides to such an extent that the edges must be dressed.

But before removing the eye-pin to permit of this being done, it sometimes happens that the blank is not of sufficient width to give the proper shape about the eye-hole, or where the handle is inserted, and some kinds of patterns require also a greater width at that point to give greater support to the handle; consequently, if the operator should discover the blank to be too narrow, he shifts it to the dies at D D, and holds it on its side, as shown by the lines in blue, controlling it by the eye-pin and its handle, as before, and there spreads or swages out the blank to its required width at the points desired.

The dies at D D, of hammer 3, are from the front to the rear, about the same shape as the dies already named at A A, that is, conforming to the sides of the axe, but their sides are rounded off from their bases to their faces, as shown at D D, to give the proper spreading action to them.

This part of the process is in many cases not required, and is only provided for to make my devices complete.

The blank, if much roughened by this swaging-operation, is again returned to the dies at A A, and struck a few blows to smooth it, when it is placed in the clamp or vise, at C C, under hammer 2.

This clamp or vise has the faces of its jaws to conform to the sides of the axe, as at A A, and one of the jaws is movable, and may be closed and held by a screw or crank, as indicated by the lines in blue, at fig. 4.

The steel end or cutting-edge of the blank in process of formation, is placed between said jaws downward, as shown at fig. 4, and a few blows are struck upon the poll to give it the required shape, the moving die in this case being the counterpart of whatever pattern is required.

And these forms I find, too, are more generally demanded by the dealers as a kind of trade-mark or specialty, than a necessity of the woodmen or users of axes.

As the edges now require finishing, the tongs are again applied, the "eye-pin" is removed by a single blow upon its point, on any of the anvils, and the blank now nearly finished, is placed between the dies A' A', in the position seen at fig. 5.

Under these dies, as shown at A A and A' A', and at C C, the operation is completed, changing from one to the other, and introducing the eye-pin when required.

It sometimes occurs that the pattern requires the poll of the axe to be considerably rounded, and to such an extent that the metal of the blank cannot be forged into the proper shape, but must be removed from the blanks.

For this purpose I have combined upon the same frame a pair of shears or cutting-dies, as shown at H H, figs. 1 and 3, which may be operated by a cam, $h$, and spring $n$, in such a manner that the operator may trim off any extra metal upon the poll before introducing the blank to the vise C C, where the poll receives its proper shape.

Having thus described my devices and the process of finishing the hammer-work upon the heads of axes, I wish to say that these devices, especially such as the dies, may be all arranged in separate machines, but they must be in sufficiently close proximity to each other that the operator can easily and quickly change from one to the other, otherwise the blank would have to be reheated before the operation could be finished.

What I claim, therefore, and desire to secure by Letters Patent, is—

1. Jointly, the method of and mechanism for forging and shaping axes, substantially as herein described.

2. The arrangement, in one machine, of the several sets of dies and the shearing-device hereinbefore described.

3. The construction and arrangement of the dies B B and C C, substantially as described.

HENRY D. MORRIS.

Witnesses:
BOYD ELIOT,
JOHN HALL.